US008621089B2

(12) United States Patent
Velusamy et al.

(10) Patent No.: US 8,621,089 B2
(45) Date of Patent: Dec. 31, 2013

(54) METHOD AND SYSTEM FOR PROVIDING SUPPLEMENTAL VISUAL CONTENT

(75) Inventors: Umashankar Velusamy, Tampa, FL (US); George L. Hughes, Jr., Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 280 days.

(21) Appl. No.: 12/342,467

(22) Filed: Dec. 23, 2008

(65) Prior Publication Data

US 2010/0161811 A1 Jun. 24, 2010

(51) Int. Cl.
*G06F 15/16* (2006.01)
(52) U.S. Cl.
USPC ............................. 709/228; 709/203; 709/217
(58) Field of Classification Search
USPC .......... 709/217–219, 227–229, 203, 217–219
See application file for complete search history.

(56) References Cited

U.S. PATENT DOCUMENTS

| 5,490,208 | A * | 2/1996 | Remillard | 379/93.19 |
|---|---|---|---|---|
| 6,571,216 | B1 * | 5/2003 | Garg et al. | 705/14.25 |
| 7,386,318 | B2 * | 6/2008 | Moon et al. | 455/456.3 |
| 7,840,689 | B2 * | 11/2010 | Stewart | 709/228 |
| 7,948,953 | B2 * | 5/2011 | Melkote et al. | 370/338 |
| 2001/0032335 | A1 * | 10/2001 | Jones | 725/105 |
| 2002/0007318 | A1 * | 1/2002 | Alnwick | 705/26 |
| 2002/0040325 | A1 * | 4/2002 | Takae et al. | 705/26 |
| 2002/0073179 | A1 * | 6/2002 | Mackintosh et al. | 709/219 |
| 2002/0188746 | A1 * | 12/2002 | Drosset et al. | 709/224 |
| 2002/0194589 | A1 * | 12/2002 | Cristofalo et al. | 725/32 |
| 2003/0191821 | A1 * | 10/2003 | Schena et al. | 709/219 |
| 2005/0165911 | A1 * | 7/2005 | Homiller | 709/219 |
| 2005/0198208 | A1 * | 9/2005 | Nystrom | 709/219 |
| 2007/0208688 | A1 * | 9/2007 | Bandhole et al. | 707/1 |
| 2007/0294721 | A1 * | 12/2007 | Haeuser et al. | 725/35 |
| 2009/0239552 | A1 * | 9/2009 | Churchill et al. | 455/456.3 |

* cited by examiner

*Primary Examiner* — Ian N Moore
*Assistant Examiner* — Jenee Alexander (57) ABSTRACT

An approach is provided for transmitting supplemental visual content to a user. A command is received to retrieve visual content associated with a transaction conducted with a user over a source device. In response to the command, the visual content is retrieved for presentation to the user via a target device.

20 Claims, 8 Drawing Sheets

METHOD AND SYSTEM FOR PROVIDING SUPPLEMENTAL VISUAL CONTENT

BACKGROUND INFORMATION

Telecommunication systems and services are critical in supporting efficient commerce. These systems are routinely used for purchasing products and services, as well as accessing customer service representatives. As such, customers can conveniently purchase a multitude of goods and services from nearly anywhere. With traditional telecommunication systems (e.g., automated voice response systems), customers can call a company to purchase a product or connect to a customer service or sales representative are required to navigate through a series of buttons and menus using the telephone. When purchasing a product, the user is generally required to know the particular product description prior to completing an order. The conventional phone-based communication does not lend itself offering alternative products to the user, as users typically require a visual inspection of the product. Although the voice response system can be programmed to provide the customer with significant information about products and services, this information can only be conveyed textually. That is, in conventional systems, the customer is presented with no visual information during the conduct of a transaction. Consequently, for example, there is no way for a user to verify visually that items being purchased are indeed the correct products.

Therefore, there is a need for an approach that facilitates transactions through the use of supplemental information that is provided during the transactions.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for providing supplemental visual content to a service requester are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a wireless device, it is contemplated that these embodiments have applicability to any device capable of communicating over a network, such as a home communication terminal (HCT), a digital home communication terminal (DHCT), television system set-top box (STB), landline connected to a Public Switched Telephone Network (PSTN), a personal digital assistant (PDA), laptop computer, and/or a personal computer (PC), as well as other like technologies and customer premises equipment (CPE).

Figure 1:
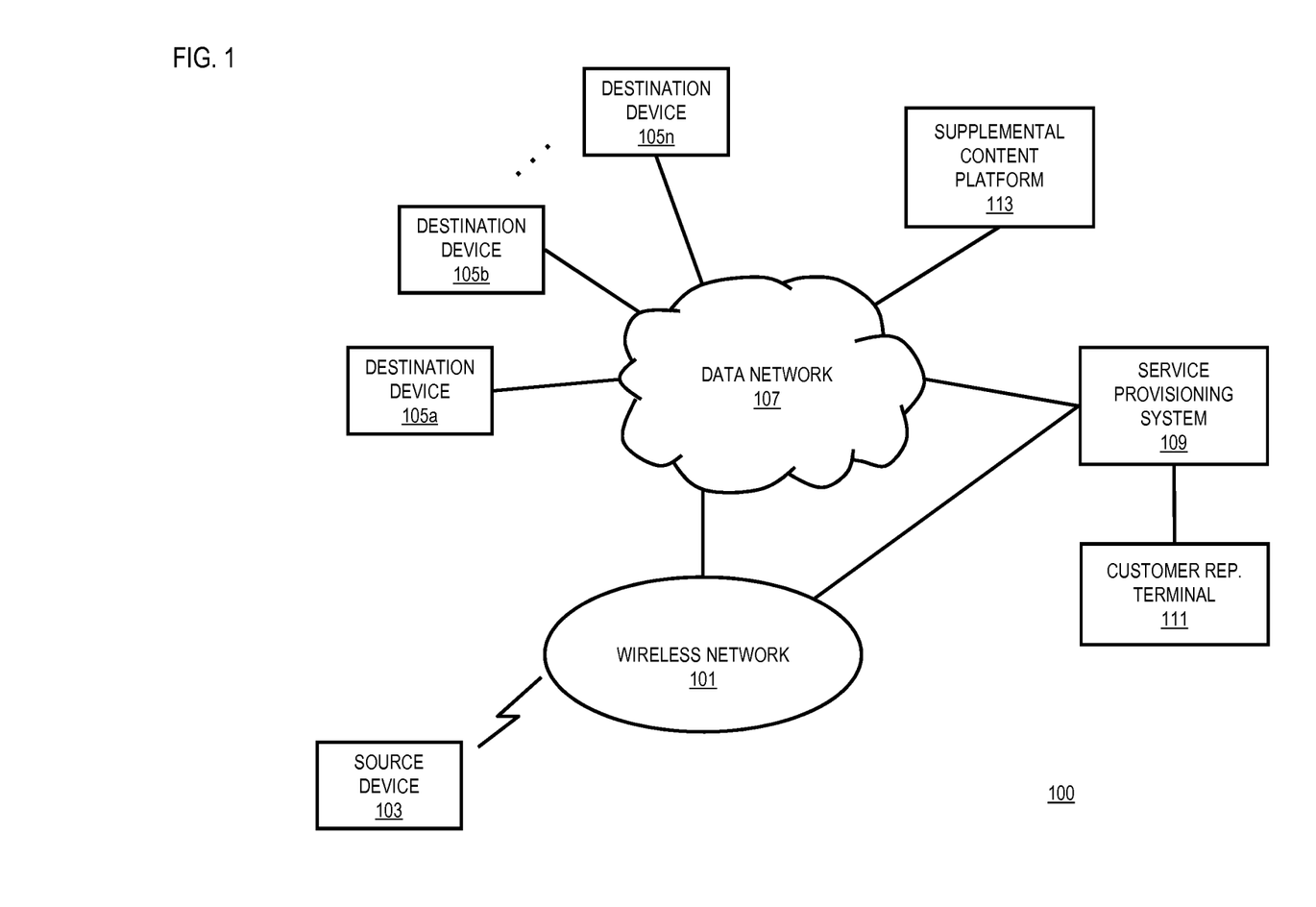
FIG. 1 is diagram of a system capable of providing supplemental visual content to a user, according to an exemplary embodiment.

FIG. 1 is diagram of a system capable of providing supplemental visual content to a user, according to an exemplary embodiment. For the purposes of illustration, a mechanism for transmitting supplemental visual content is described with respect to a communication system 100 that includes a wireless network 101 supporting source device 103. The system 100 also supports transmission of visual content to destination devices 105a-105n connected via a data network 107. In this embodiment, each of the destination devices 105a-105n can be any computing device with a display screen (e.g., desktop computer, laptop computer, PDA, or television) capable of communicating over the data network 107 and of displaying visual content (e.g., images, videos, etc.). Source device 103 can also be one of the destination devices 105a-105n.

The wireless network 101 is a wireless access and transport network, such as a cellular (2G, 3G, 4G, or above), 802.11, 802.15, 802.16, or satellite network; and may employ various mobile communication technologies including, for example, in cellular networks, global system for mobile communications/universal mobile telecommunication system (GSM/UMTS) technologies (i.e., 3GPP technologies) and code division multiple access (cdmaOne/CDMA2000) technologies (i.e., 3GPP2 technologies).

As mentioned, traditional systems provide no visual feedback when users are engaged in a transaction (e.g., purchase of a good or service). Although, for example, video phones could allow a user to see the representative at the other end of the phone call, video phones require special equipment for both parties and are not integrated into a system that provides images of the items to be purchased. As a result, users cannot verify that the service representative has entered the correct information for the purchase. In addition, if the purchase were made in an actual store, the user would be able to see related items, such as accessories for the purchased item. Over the phone, however, without visual feedback the user is unable to view such other items that might be of interest. Further, a customer requesting directions to a local restaurant, for example, cannot visualize the route, as no visual information, such as a map with the route highlighted, is exchanged in real time with the customer. In addition, service providers have no means to present to customers (who are purchasing items by phone visual advertisements) for products related to the purchased items.

Figure 2:
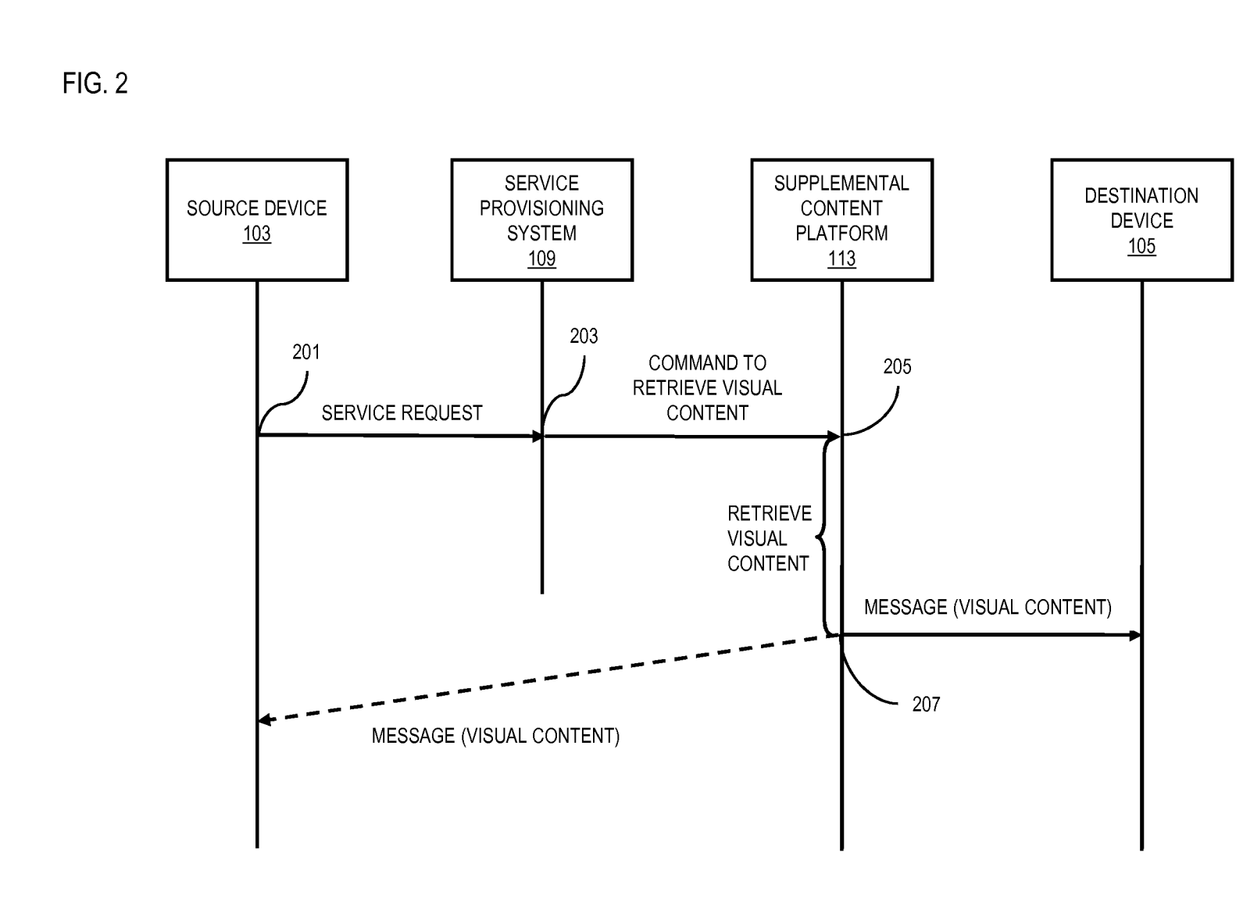
FIG. 2 is a diagram of an exemplary process for providing supplemental visual content to a user, according to an exemplary embodiment.

To address this problem, service provisioning system 109 determines the nature of the request and appropriate types of visual information that may be associated with the request. Depending on the type of service request, the visual content might include copies of the purchase order, images of the purchased items, advertisements for related items, such as accessories for the purchased items, or a mapped out route to a specified location. Once the type of visual content has been identified, service provisioning system 109 sends a message to supplemental content platform 113 with an order to retrieve the visual content (step 203).

Within the system 100, source device 103 (e.g., a mobile phone, wireless terminal, laptop, etc.) contacts service provisioning system 109 through wireless network 101 to request a service. Service provisioning system 109 may include a customer representative terminal 111 or may be an automated answering service. The service provisioning system 109 is further detailed in FIG. 4. In this embodiment, the request from source device 103 can be, for example, for placing a purchase order for one or more items or for obtaining directions to a particular location.

Once the service provisioning system 109 determines the nature of the request from source device 103, supplemental visual content related to the request is retrieved from supplemental content platform 113 through data network 107. The visual content can include images of the ordered item or items, a copy of the purchase order, advertisements for related items such as accessories for the purchased item, or a map with directions to a location indicated via a highlighted route. The additional content may also include videos of the purchased items or of related items. The supplemental visual content is forwarded to one or more of destination devices 105a-105n (including source device 103) through data network 107. Details of the supplemental content platform 113 are described with respect to FIG. 3.

FIG. 2 is a diagram of an exemplary process for providing supplemental visual content to a user, according to an exemplary embodiment. Source device 103 requests a service from service provisioning system 109 at step 201. In one embodiment, the request may be to customer service for ordering one or more items, or for obtaining directions. Once the type of visual content has been identified, service provisioning system 109 sends a message to supplemental content platform 113 with an order to retrieve the visual content (step 203). It is contemplated that visual content may include live video.

Supplemental content platform 113, in step 205, retrieves the visual content specified in the order and in step 207 transmits a message including the visual content to one or more destination devices 105a-105n. Per step 207, the process may optionally include transmission of the visual content message back to source device 103 as one of the destination devices. The customer may then view the transmitted visual content on the display screen of the source device 103, on a television screen, on a computer screen, and/or on a PDA, for example.

Figure 3:
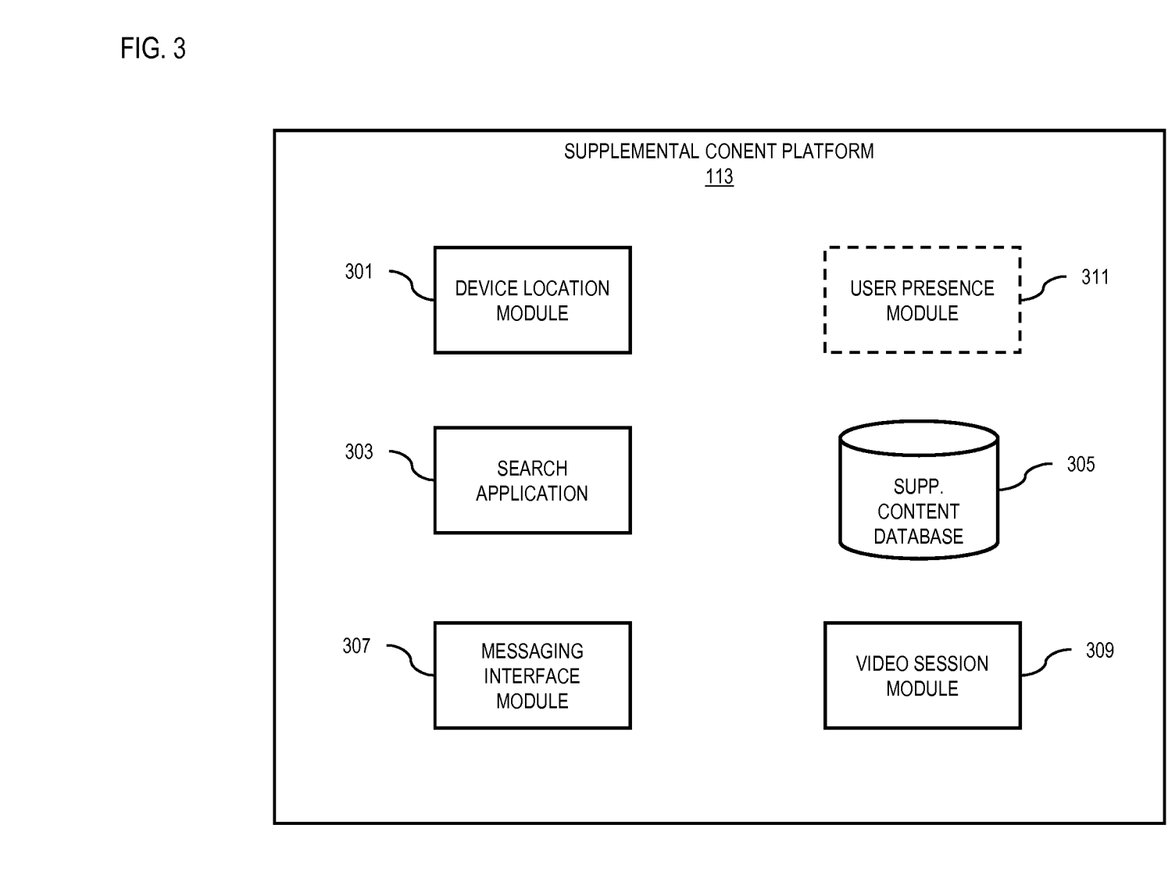
FIG. 3 is a diagram of an exemplary supplemental content platform, according to an exemplary embodiment.

FIG. 3 is a diagram of an exemplary supplemental content platform, according to an exemplary embodiment. In this example, supplemental content platform 113 includes the following components: a device location module 301, a search application 303, a supplemental content database 305, messaging interface module 307, a video session module 309, and optionally a user presence module 311. Device location module 301 is responsible for locating the source device 103. Module 301 can include location-based technology such as a Global Positioning System (GPS) device. Module 301 also may contact source device 103 for location information if source device 103 is GPS enabled.

In one embodiment, the device location module 301 utilizes a combination of autonomous GPS and Assisted GPS (A-GPS); in particular, mobile-centric A-GPS. To better understand the hybrid A-GPS environment, it is instructive to describe the operation of the general operation of a mobile-centric A-GPS system. By way of example, the source device 103 includes GPS hardware and intelligence, whereby the network 101 employs mechanisms for providing GPS aiding data (or assistance data). The network 101 includes base transmitters and some base receivers containing GPS hardware from which the ephemeris and approximate location can be obtained, constituting a GPS reference network. The assistance data that is transmitted to the devices 103, in an exemplary embodiment, can include ephemeris data differential GPS correct data, timing data and/or other aiding data. Using the aiding (or assistance) data, the device 103 performs geolocation calculations, yielding a number of advantages. For example, the device 103 can generate real-time speed and route adherence alerts. Additionally, transmission of geolocation data need not be frequent. Transmission of geolocation data is more compact because it is true location rather than pseudo range data. Also, the device 103 can more intelligently request assistance data because the device 103 itself can determine when the ephemeris data is no longer valid. The hybrid A-GPS system thus permits fast and precise geolocation when in network coverage of the network 101, while providing immunity from obstructed view of the sky. Also, when the switch is made to autonomous GPS mode (when outside of the coverage area of the network 101), the device 103 can still obtain geolocation data.

The search application 303 has access to supplemental content database 305 and configures searches of the database 305 in accordance with the type of supplemental content specified by service provisioning system 109. Once the search application retrieves the appropriate visual content, messaging interface module 307 then transmits the additional content to the destination devices 105a-105n via data messages across data network 107. Although supplemental content database is shown in FIG. 3 as a single database that is part of supplemental content platform 113, search application 303 can have access to multiple databases both within supplemental content platform 113 and also connected across data network 107.

Video session module 309 is responsible for establishing a video session between a service representative at customer representative terminal 111 and destination devices 105a-105n. Video session module 309 can receive user presence information from service provisioning system 109 or user presence can be determined by user presence module 311. Either service provisioning system 109 or module 311 identifies which of the customer's destination devices 105a-105n are currently active and provides that information to video session module 309. Then module 309 can establish a video session between the service representative and the active devices, allowing two-way continuous video communication. The video session may also be a one-way communication, displaying visual content only to the subscriber; alternatively, the visual content may be displayed only to the service representative.

Figure 4:
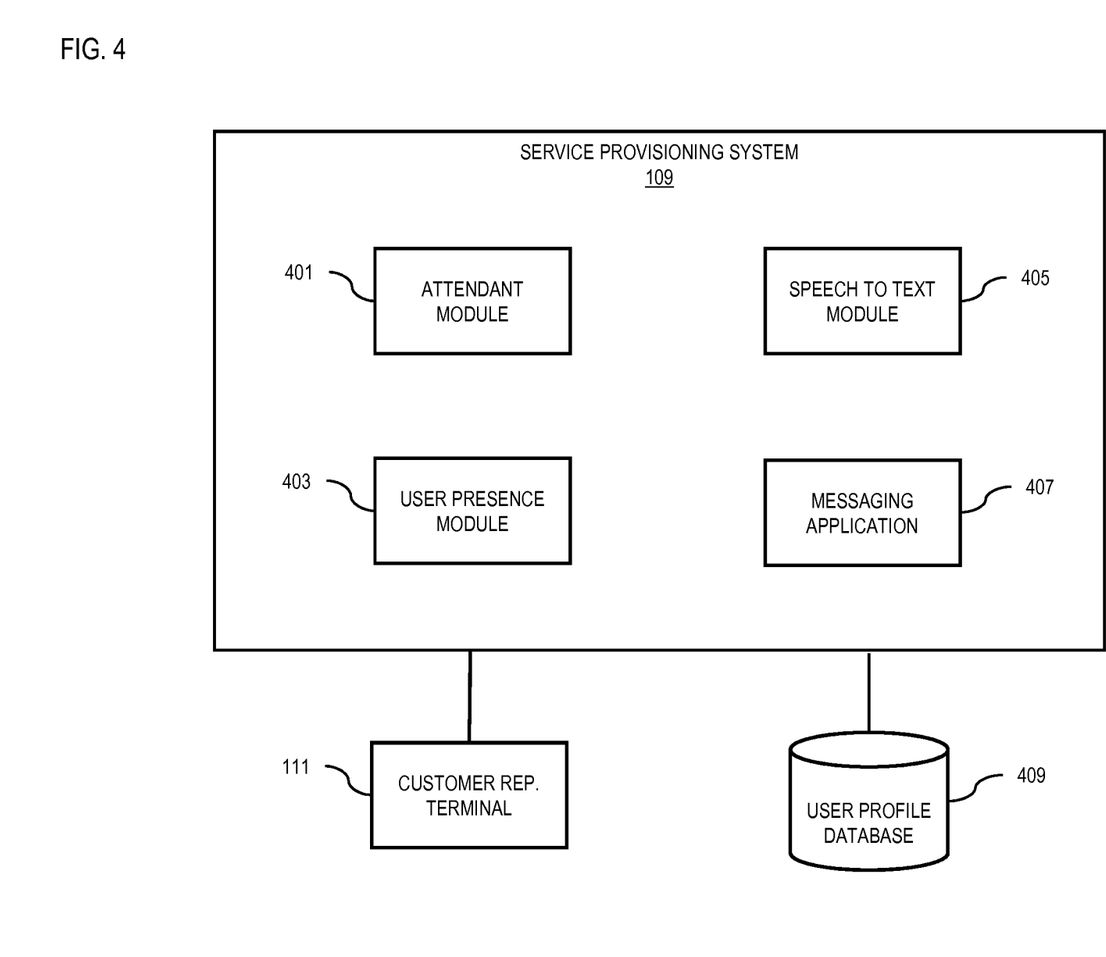
FIG. 4 is an exemplary service provisioning system, according to an exemplary embodiment.

FIG. 4 is an exemplary service provisioning system, according to an exemplary embodiment. Service provisioning system 109 includes an attendant module 401, a user presence module 403, a speech to text module 405, and a messaging application or module 407. Service provisioning system 109 further has access to a customer representative terminal 111 and a user profile database 409. Attendant module 401 receives communications from source device 103 and responds to the user's needs with prompts for information from the user. Attendant module 401 can be accompanied by a customer representative terminal 111. The user's selections can be input via a keypad on the source device 103 or vocally. For vocal responses, speech to text module 405 converts the information to text for processing by the attendant module 401.

The attendant module 401 either extracts information about the destination devices 105 from the user's responses or accesses user profile database 409 to determine which destination devices 105 have been registered (or otherwise specified) by the user. In one embodiment, the user profile database may reside externally, such as with a service provider. User presence module 403 then checks each specified and registered destination device for availability.

In addition, the attendant module 401 identifies the type of service request and determines all appropriate types of supplemental content. For example, when the service request is a purchase order, supplemental content could include a summary of the purchase, an image of the purchased item(s), and advertisements for related items.

Messaging application 407 acquires the destination device information from the user presence module 403 and the supplemental content information from attendant module 401 and generates a message to supplemental content platform 113. The message specifies the type of supplemental content that needs to be obtained from database 305 and the available destination devices to which the content should be sent.

Figure 5:
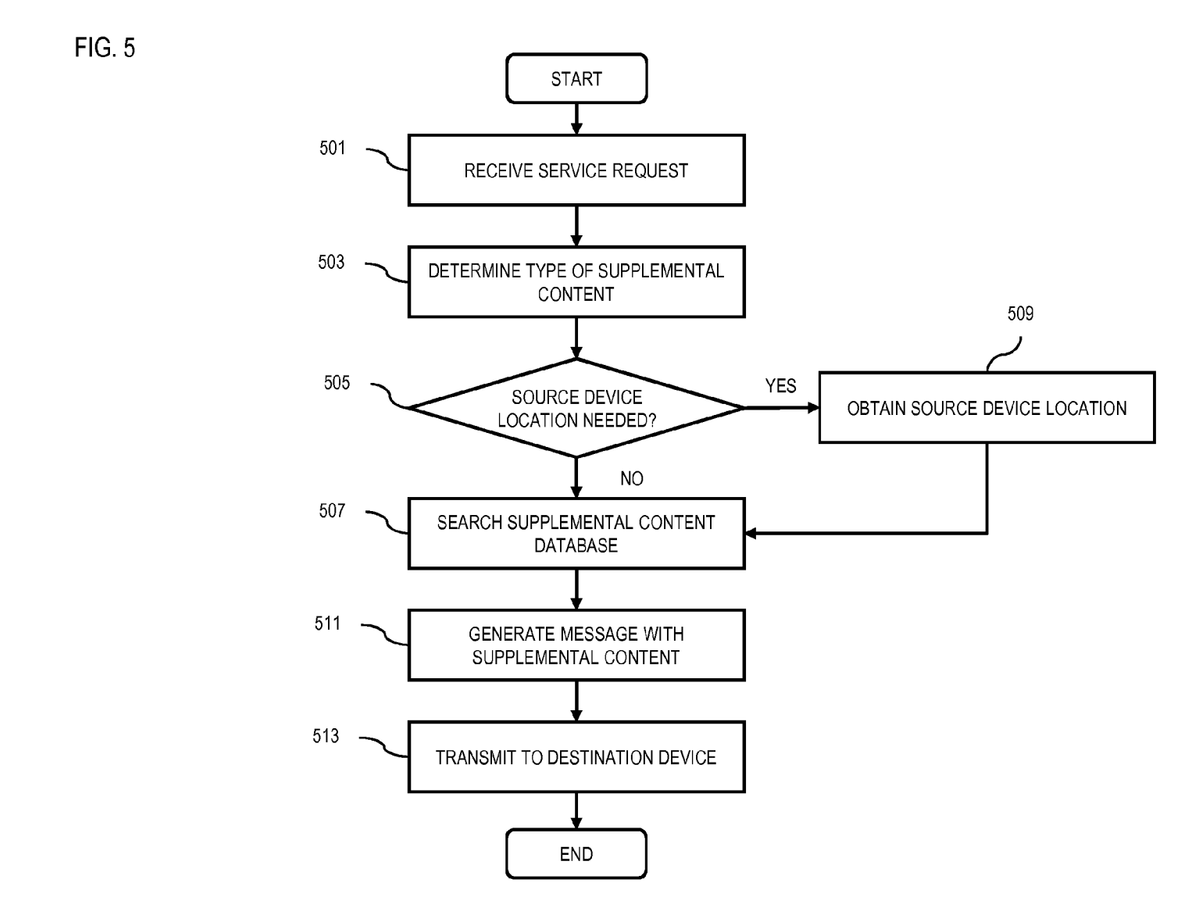
FIG. 5 is a flowchart of a process for providing supplemental visual content to a user, according to an exemplary embodiment.

FIG. 5 is a flowchart of a process for providing supplemental visual content to a user, according to an exemplary embodiment. In step 501, a service request is received. The request may be a purchase order or a request for directions to a particular location, for example. The request is evaluated and a determination is made as to an appropriate type of supplemental information according to the type of request (step 503). For instance, if the request is a purchase order, the appropriate type of additional content may include a copy of the order summary, a picture of the item being purchased, and/or advertisements for accessories or related items. The content can include both pictures and videos. On the other hand, if the request is for directions, the supplemental content might be a map with the route highlighted.

It is noted that the communication may initially start with simply a voice call, and continue with a subsequent one-way/two-way video feed. As the conversation progresses, other supplemental visual content may be exchanged. That is, the first service request is received, and a communication channel is established. Thereafter, additional service requests can be received, resulting in operations that are either the same as or different from that of the first service request. The two-way visually interactive communication channel which may include one-way or two-way video, as well as images, video, animated text, simply text-based content, etc. pushed to the users target device(s). An example is a pizza restaurant, where a customer calls to order pizza, and a visual channel is established; at this point, no video is yet provided. However, if the customer is asking about other food items (e.g., wings, breadsticks, etc.), then a video about the particular items may be pushed, along with advertisements for beverages, etc. After the customer places the order, the purchase details or as and when the customer is ordering, the order information may appear (e.g., on the side of the display). Therefore, this exchange is a real time interactive visual communication channel, which supplies supplemental visual content in response to user actions/requests from the user/information provided by the user. The user may be on-line (e.g., the Internet) when calling. As such, the video content can be shown on the user's computer; in other embodiments, the user may switch to a TV during the session. Consequently, the content can alternatively (or in addition to) be pushed to the TV. Although this example involves two concurrent communication sessions, it is contemplated that multiple target devices (e.g., more than 2) can be engaged concurrently.

Once the type of supplemental content is ascertained, a determination is made in step 505 as to whether the location of the source device is needed. If the position of the source device is required for providing the supplemental content, the location is obtained in step 509. The source device location can be retrieved from the source device's GPS hardware or can be obtained using device location module 301 of supplemental content platform 113.

If no source device location is needed or after the source device location is obtained, the next step is to search the supplemental content database 305 for images and/or video (step 507). Once all of the appropriate supplemental information has been retrieved from the database, a message including the content is generated in step 511 and transmitted to the destination device in step 513.

Figure 6:
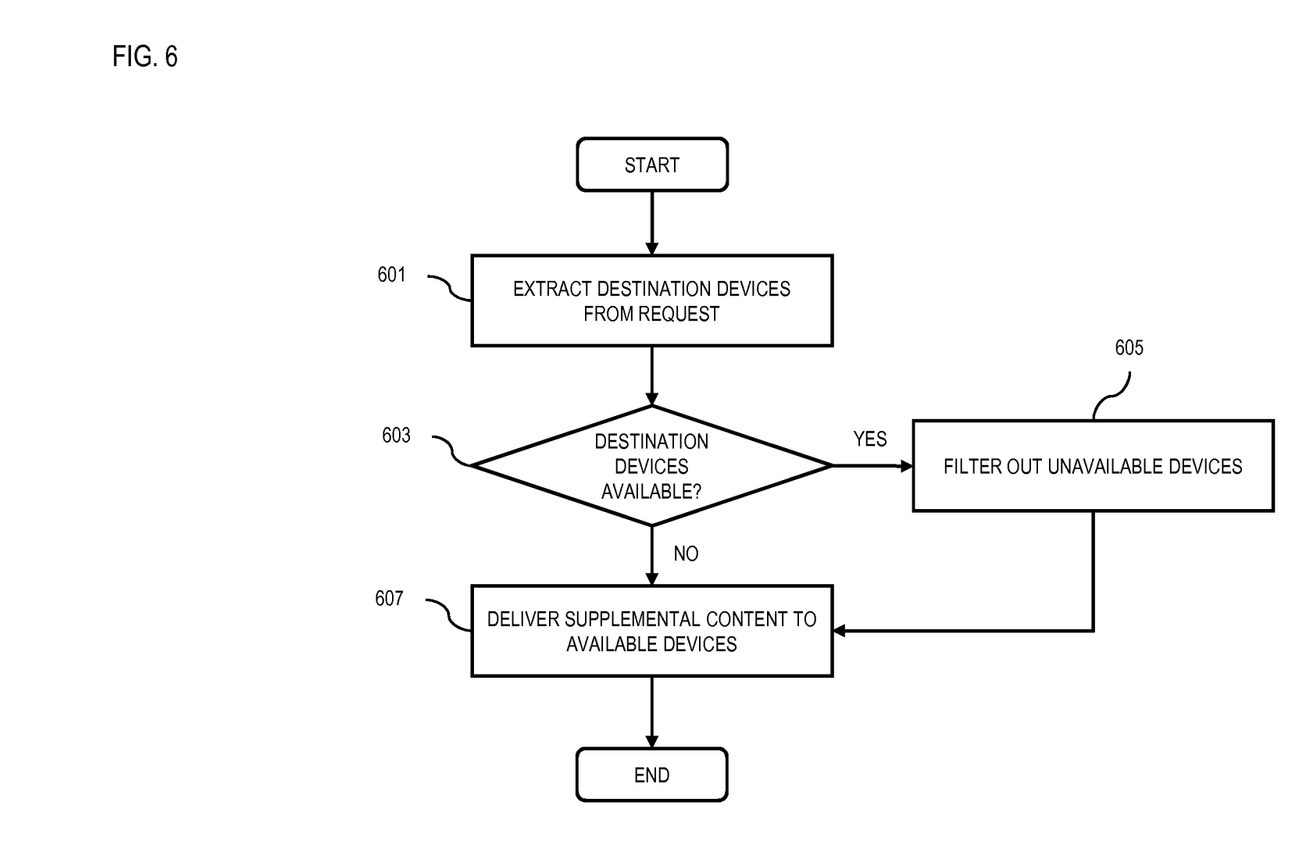
FIG. 6 is a flowchart of a process for providing supplemental visual content to multiple destination devices, according to an exemplary embodiment.

FIG. 6 is a flowchart of a process for providing supplemental visual content to multiple destination devices, according to an exemplary embodiment. When a service request is received from a user, the desired destination devices are extracted from the request in step 601. In step 603, each destination device is checked to determine if it is available. If any destination device is unavailable, it is filtered out per step 605. Then, in step 607, the supplemental content retrieved during the search of the supplemental content database 113 is delivered to all of the available destination devices. It is noted that the supplemental visual content may not be retrieved and transmitted as-is, but can be pre-processed. That is, the visual content may be manipulated to suit the user's needs as well. For example, depending on the user's profile, the content may include a current promotion; hence when displaying the video of the product, the content may show the promotional price overlaid on the image of the object.

The following examples illustrate how supplemental visual content can be utilized to facilitate certain transactions. In one example, using a mobile phone, a customer calls an Italian restaurant to order a pizza. The representative answering the call can feed photographs of the types of pizzas available for the customer to choose. After the customer selects a pizza, an image of the ordered pizza with the toppings can be displayed. Deals or specials may also be displayed. For example, in addition to the image of the pizza, an image of chicken wings and breadsticks may also be shown to the customer via a display of the mobile phone; or if the customer is near a computer or a television display, the images can be transmitted to one or more of these devices (e.g., destination devices 105). Under such a scenario, the representative may ask the customer where to direct the image. Alternatively, the supplemental content platform 113 may maintain presence information about the user; the user profile database 409 may indicate the devices associated with the user and presence information relating to these devices.

Moreover, the representative may ask the customer if he/she wishes to add the breadsticks and the chicken wings to the order. In addition, advertisements which would encourage the customer to buy products in the future might be fed briefly to the customer while the sale is being completed or just afterwards.

In another example, a user calls to place an order for a product, e.g., laptop, that he has just seen on television. Since the manufacturer of the laptop sells several accessories, the service provisioning system selects as supplemental visual content small advertisements of working laptop accessories. These advertisements can be fed to the user's calling or source device. Alternatively, they can be fed to any device with a display screen to which the user has access, such as the user's mobile phone, or even a television in the user's home, set on a specific channel. The visual presentation of the accessories will encourage the user to buy the accessories. The user can then add the accessories to the purchase order. It is also possible to play longer running advertisement videos about the product exclusively for the user in his choice of electronic devices while the user is talking to the user service representative. Such longer videos would otherwise be cost prohibitive to advertise through television commercial slots.

In a further example, a user may call directory assistance to obtain the location of an Italian restaurant in a specific area. Details about the best ranked Italian restaurants in the area can be fed to the user's devices, along with location information. Further, any promotional offers from the restaurants in the area may be fed to the user's electronic devices.

In addition, if the user's calling device is GPS enabled, as a most current customized route map from the user's current position to a destination can be fed to the user's electronic devices. This could serve as an alternative for people who do not want to purchase expensive GPS based navigation systems, allowing them to use navigation services on a need only basis.

Figure 7:
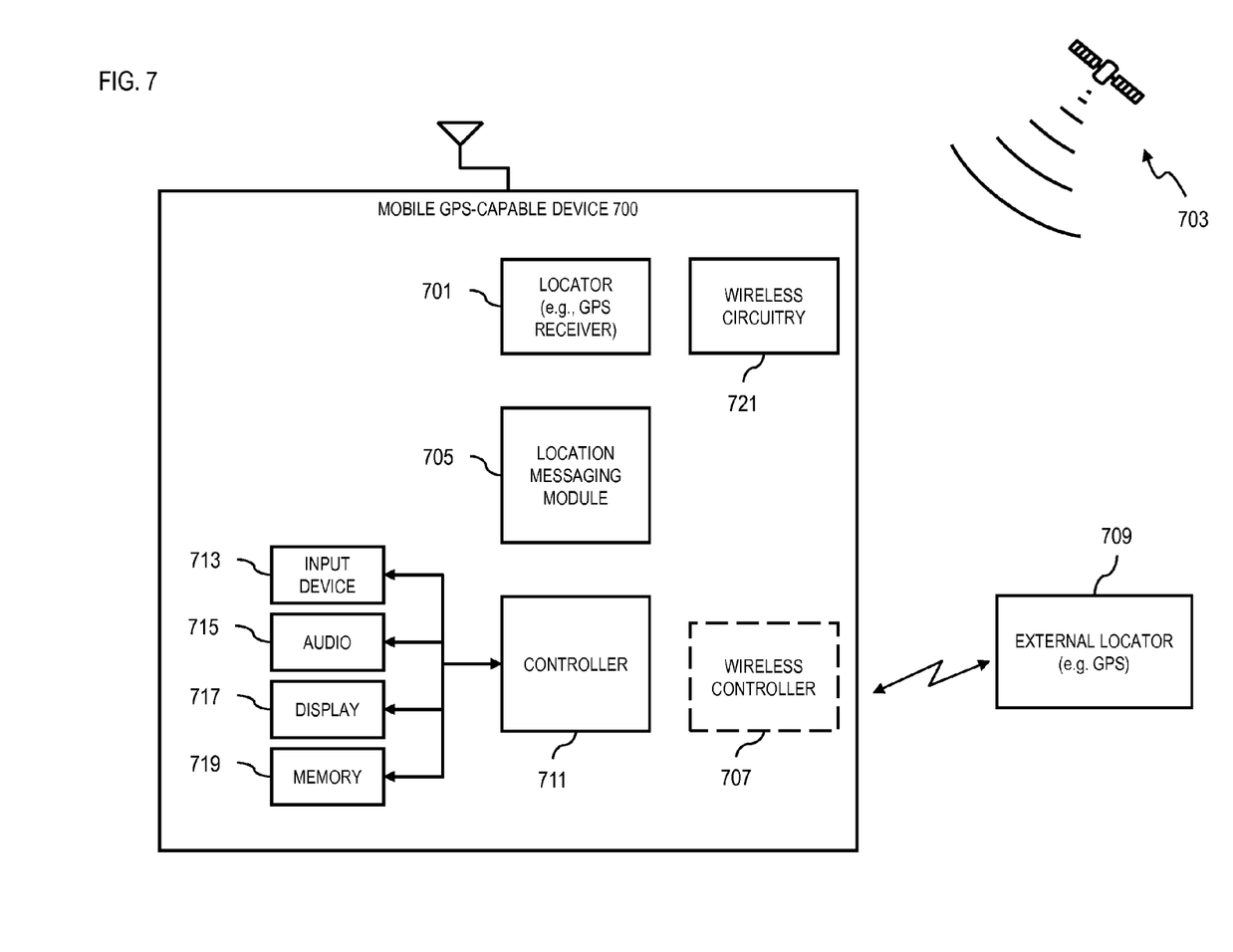
FIG. 7 is a diagram of a mobile device, according to an exemplary embodiment.

FIG. 7 is a diagram of a GPS enabled mobile device, according to an exemplary embodiment. In this embodiment, the mobile device 700 includes a locator 701 to determine the location of the mobile device 700. By way of example, the locator 701 includes a GPS receiver that receives position data from multiple GPS satellites 703. These GPS satellites 703 transmit very low power interference and jamming resistant signals. At any point on Earth, the locator 701 can receive signals from multiple satellites. Specifically, locator 701 may determine three-dimensional geolocation (or spatial positioning information) from signals obtained from, for instance, at least four satellites. Measurements from satellite tracking and monitoring stations located around the world are incorporated into orbital models for each satellite to compute precise orbital or clock data. GPS signals are transmitted over two spread spectrum microwave carrier signals that are shared by GPS satellites 703. Mobile device 700 needs to identify the signals from at least four satellites 703, decode the ephemeris and clock data, determine the pseudo range for each satellite 703, and compute the position of the receiving antenna. With GPS technology, mobile device 700 can determine its spatial position with great accuracy and convenience. It is contemplated that the various exemplary embodiments are also applicable to other equivalent navigational and location determination technologies. The position data may be utilized by the location messaging module 705 to provide location information to supplemental content platform 113.

In addition (or alternatively), the mobile device 700 can be equipped with a wireless controller 707 to communicate with an external locator 709 (e.g., GPS device or a device utilizing other location-based technology) for acquisition of position data. The external GPS device can employ any number of standard wireless technologies to communicate with the wireless controller 711; for example, the external GPS device can use short range radio transmission technology, such as BLUETOOTH™. It is contemplated that other equivalent short range radio technology and protocols can be utilized. It also is contemplated that the external GPS device may be a compatible stand-alone device, automobile navigation system, or other equivalent system.

A controller 711 is provided to control functions of an input device 713 (e.g., keyboard, touch screen, or other input mechanism), an audio function circuitry 715, a display unit 717, and a memory 719. A user can enter information for responding to service provisioning system 109 using the input device 713. The audio function circuitry 715 provides audio cues to the user to support various applications and mobile device functions. Similarly, the display unit 717 provides a display to the user in support of various applications and mobile device functions, such as the supplemental visual content from supplemental content platform 113. The memory 719 can store distribution lists, allowed incoming devices lists, and preferences. In addition, the mobile device 700 employs wireless circuitry 721 to communicate over the wireless network 101 (of FIG. 1).

The processes described herein for providing supplemental information associated during a transaction may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
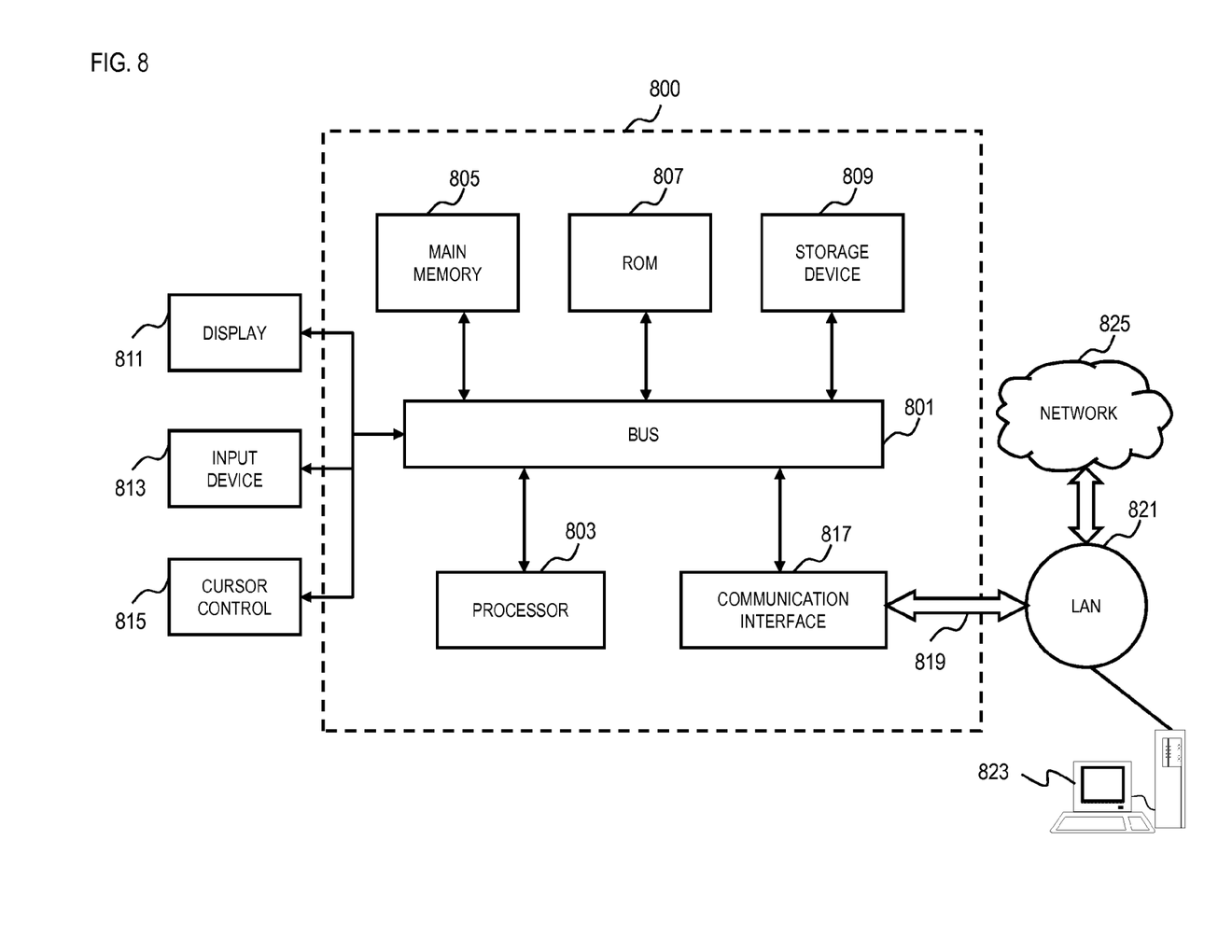
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving at a server a command to retrieve visual content associated with a product or service purchase transaction currently being conducted with a user over a source device, wherein the source device communicates with the server over a voice call; and
   retrieving by the server, in response to the command, the visual content for presentation during the transaction to the user via one or more target devices including the source device,
   wherein a promotion is displayed, based on a profile of the user, as overlaid on an image of a product or service to be purchased via the transaction,
   the target device communicates with the user over a communication session that is concurrent with the voice call, and
   the visual content includes routing information that is based on a location of the source device.

2. A method according to claim 1, wherein the source device is a mobile phone, and the promotion includes a promotional price of the product or service.

3. A method according to claim 1, wherein the voice call is made over a public switched telephone network, and the communication session is a data session for transporting one or more images.

4. A method according to claim 1, wherein the one or more target devices are specified by the user.

5. A method according to claim 1, wherein the routing information includes a map.

6. A method according to claim 1, further comprising: accessing a user profile of the user to determine the one or more target devices.

7. A method according to claim 1, wherein the visual content includes a transaction order summary, an image of the product being purchased, one or more advertisements for accessories or related items, or a combination thereof.

8. A method according to claim 1, wherein another server conducting the transaction determines the visual content based upon a service request transmitted from the source device, and the method further comprising:

pushing the visual content from the server to the one or more target devices without involving the another server.

9. An apparatus comprising:

a communication interface configured to receive a command to retrieve visual content associated with a product or service purchase transaction currently being conducted with a user over a source device, wherein the source device communicates with the server over a voice call; and a processor configured to retrieve, in response to the command, the visual content from a database for presentation during the transaction to the user via one or more target devices including the source device, wherein a promotion is displayed, based on a profile of the user, as overlaid on an image of a product or service to be purchased via the transaction, the target device communicates with the user over a communication session that is concurrent with the voice call, and the visual content includes routing information that is based on a location of the source device.

10. An apparatus according to claim 9, wherein the source device is a mobile phone, and the promotion includes a promotional price of the product or service.

11. An apparatus according to claim 9, wherein the voice call is made over a public switched telephone network, and the communication session is a data session for transporting one or more images.

12. An apparatus according to claim 9, wherein the one or more target devices are specified by the user.

13. An apparatus according to claim 9, wherein the processor is further configured to determine the location of the source device, and to provide the routing information to the user via the target device based on the location of the source device.

14. An apparatus according to claim 9, wherein the routing information includes a map.

15. An apparatus according to claim 9, wherein the processor is further configured to access a user profile of the user to determine the one or more target devices.

16. An apparatus according to claim 9, wherein the visual content is generated based on a profile of the user.

17. A method comprising:

communicating between a server and a source device of a user via a voice call about a business transaction that is currently being conducted;

generating at the server a command specifying retrieval of visual content associated with the transaction; and transmitting the command from the server to a supplemental content platform over a data network to retrieve the visual content, to determine supplemental information to include in the visual content as a message, and to transmit the message including the visual content and the supplemental information to one or more target devices including the source device, wherein a communication session is established between the server and the target device to present the visual content to the user during the transaction, a promotion is displayed, based on a profile of the user, as overlaid on an image of a product or service to be purchased via the transaction, the target device communicates with the user over the communication session that is concurrent with the voice call, and the visual content includes routing information that is based on a location of the source device.

18. A method according to claim 17, wherein the source device is a mobile phone, and the promotion includes a promotional price of the product or service.

19. A system comprising:

a service provisioning system configured to communicate with a source device of a user about a product or service purchase transaction currently being and to generate a command specifying retrieval of visual content associated with the transaction, wherein the source device communicates with the system over a voice call; and a supplemental content platform configured to receive the command over a data network, and to transmit the message including the visual content to one or more target devices including the source device, wherein a communication session is established with the one or more target devices to present during the transaction the visual content to the user for assistance with the transaction, a promotion is displayed, based on a profile of the user, as overlaid on an image of a product or service to be purchased via the transaction, the one or more target devices communicate with the user over the communication session that is concurrent with the voice call, and the visual content includes routing information that is based on a location of the source device.

20. A system according to claim 19, wherein the source device is a mobile phone, and the promotion includes a promotional price of the product or service.

* * * * *